United States Patent
Doyle et al.

(10) Patent No.: US 10,601,010 B2
(45) Date of Patent: Mar. 24, 2020

(54) RECOMBINATION VENT CAP

(71) Applicants: Michael A. Doyle, Holland, OH (US);
Drew Barrett, Marquette, MI (US)

(72) Inventors: Michael A. Doyle, Holland, OH (US);
Drew Barrett, Marquette, MI (US)

( * ) Notice: Subject to any disclaimer, the term of this patent is extended or adjusted under 35 U.S.C. 154(b) by 166 days.

(21) Appl. No.: 15/794,839

(22) Filed: Oct. 26, 2017

(65) Prior Publication Data

US 2018/0114965 A1 Apr. 26, 2018

Related U.S. Application Data

(60) Provisional application No. 62/413,124, filed on Oct. 26, 2016, provisional application No. 62/545,206, filed on Aug. 14, 2017.

(51) Int. Cl.
*H01M 2/12* (2006.01)
*F21V 31/03* (2006.01)
*H01M 10/52* (2006.01)
*H01M 10/42* (2006.01)

(52) U.S. Cl.
CPC .......... *H01M 2/1264* (2013.01); *F21V 31/03* (2013.01); *H01M 2/1205* (2013.01); *H01M 10/523* (2013.01); *H01M 2/127* (2013.01); *H01M 10/4214* (2013.01)

(58) Field of Classification Search
CPC ............. H01M 2/1264; H01M 2/1205; H01M 10/523; H01M 2/127; H01M 10/4214; F21V 31/03
See application file for complete search history.

(56) References Cited

U.S. PATENT DOCUMENTS

| | | | |
|---|---|---|---|
| 1,010,695 A | 12/1911 | Sloan | |
| 1,459,121 A | 6/1923 | Van De Wiel | |
| 1,469,119 A | 9/1923 | Stallings | |
| 2,570,123 A | 10/1951 | Heine | |
| 2,615,062 A * | 10/1952 | Craig | .......... H01M 10/52 422/211 |
| 3,038,954 A | 6/1962 | Pattison et al. | |
| 3,392,060 A | 7/1968 | Favre | |
| 3,899,358 A | 8/1975 | Sundberg | |
| 3,907,605 A | 9/1975 | Melone | |
| 3,915,752 A | 10/1975 | Gross | |
| 3,992,226 A | 11/1976 | Godshalk | |
| 4,052,534 A | 10/1977 | Devitt | |
| 4,113,925 A | 9/1978 | Kohler et al. | |
| 4,186,247 A | 1/1980 | Mocas | |
| 4,223,370 A | 9/1980 | Quere et al. | |
| 4,317,868 A | 3/1982 | Spiegelberg | |
| 4,371,591 A | 2/1983 | Oxenreider et al. | |
| 4,394,423 A | 7/1983 | Ledjeff | |
| 4,447,508 A | 5/1984 | Jensen | |

(Continued)

FOREIGN PATENT DOCUMENTS

EP 1674424 A1 6/2006

*Primary Examiner* — Stewart A Fraser
(74) *Attorney, Agent, or Firm* — Shumaker, Loop & Kendrick, LLP; James D. Miller (57) ABSTRACT

A vent cap assembly for recombining water for a battery includes a cylindrical base having an upper portion and a lower portion. The lower portion configured to be inserted into a vent port. A cap encloses the cylindrical base. A catalyst component is received in the base configured to hydronate hydrogen and oxygen to water.

20 Claims, 13 Drawing Sheets

(56) References Cited

U.S. PATENT DOCUMENTS

| | | |
|---|---|---|
| 4,477,542 A | 10/1984 | Braswell |
| 4,486,515 A | 12/1984 | Chern |
| 4,613,550 A | 9/1986 | Jergl et al. |
| 4,689,281 A | 8/1987 | Dandona et al. |
| 4,859,547 A | 8/1989 | Adams et al. |
| 5,108,853 A | 4/1992 | Feres |
| 5,284,720 A | 2/1994 | Thuerk et al. |
| 5,525,438 A | 6/1996 | Kostrivas et al. |
| 5,686,202 A | 11/1997 | Hooke et al. |
| 5,766,936 A | 6/1998 | Kayal et al. |
| 5,981,099 A | 11/1999 | Bourbeau |
| 6,277,517 B1 | 8/2001 | Thomas et al. |
| 6,432,573 B1 | 8/2002 | Oschmann |
| 6,461,758 B1 | 10/2002 | Geibl et al. |
| RE37,901 E | 11/2002 | Fritts et al. |
| 6,554,025 B1 | 4/2003 | Fitter |
| 6,562,517 B1 * | 5/2003 | Misra ............... H01M 2/1205 429/225 |
| 6,635,387 B2 | 10/2003 | Fitter et al. |
| 6,746,795 B2 | 6/2004 | Schwarz |
| 8,999,565 B2 | 4/2015 | Doyle |
| 9,461,287 B2 | 10/2016 | Doyle |
| 2003/0059679 A1 | 3/2003 | Rodriguez et al. |
| 2004/0013936 A1 | 1/2004 | Barrett, Jr. |
| 2006/0141342 A1 | 6/2006 | Marconi et al. |
| 2010/0323229 A1 | 12/2010 | Campau |
| 2013/0034757 A1 | 2/2013 | Doyle |

\* cited by examiner

RECOMBINATION VENT CAP

CROSS-REFERENCE TO RELATED APPLICATIONS

This patent application claims the benefit of U.S. Provisional Patent Application Ser. No. 62/413,124, filed on Oct. 26, 2016, and U.S. Provisional Patent Application Ser. No. 62/545,206, filed Aug. 14, 2017. The entire disclosures of the above patent applications are hereby incorporated herein by reference.

FIELD OF THE INVENTION

The invention relates to batteries, and more particularly to a recombination vent cap for a battery.

BACKGROUND OF THE INVENTION

Electrolytes are commonly employed as a catalyst in batteries to promote the movement of ions between an anode of the battery and a cathode of the battery during charging and discharging. Electrolytes may be aqueous, gelled or dry electrolytes comprising soluble salts, acids, or bases.

During charging and discharging of a battery, in a process referred to as cycling, electrolytes may be converted into a gas as water in the electrolyte is separated into hydrogen and oxygen. Vent caps are typically employed to allow the gas to freely escape from the battery, subjecting the battery to lower fluid levels as water and the electrolytes are gradually reduced. The water vapor typically escapes through vents and valves in the vent caps.

To maintain performance of the battery, it is necessary to periodically add water to the battery which increases maintenance costs. For example, a battery with lower fluid levels may not charge to a full capacity, and may indicate high voltages during charging, as the battery is unable to draw current. Therefore, it is necessary to properly maintain a desired level of fluid within the battery.

Certain vent caps are known to increase an amount of time between maintenance periods required to add water to the batteries. Examples of vent caps or similar devices are shown and described in U.S. Pat. Nos. 8,999,565, 9,461,287, and U.S. Pat. Appl. Pub. No. 2013/0034757, the disclosures for which are hereby incorporated by reference in their entirety. For example, a battery vent cap such as the WATER-MISER™ battery vent cap manufactured by Doyle Manufacturing, Inc. is employed to minimize watering maintenance periods of the batteries by capturing water vapor before the water vapor escapes from the battery through vents formed in the battery vent cap. The vent caps include a plurality of plastic pellets to condense the water vapor and redirect or recombine the water back into the battery. A micro-porous disc may also be included to condense and capture water vapor before escaping the battery and redirect the condensed water back into the battery. While these vent caps are successful in minimizing the evaporation of water from the battery cell, there is an increasing need to further limit the evaporation of the water from the battery.

Accordingly, there exists a need in the art for an improved vent cap for recombining water to the battery.

SUMMARY OF THE INVENTION

In concordance and agreement with the present invention, an improved vent cap for recombining water to the battery, has surprisingly been discovered.

In one embodiment, a vent cap assembly for recombining water for a battery is disclosed. The vent cap assembly includes a cylindrical base having an upper portion and a lower portion. The lower portion is configured to be inserted into a vent port of the battery. A cap encloses the cylindrical base. A catalyst component is received in the base and is configured to hydronate hydrogen and oxygen to water.

In another embodiment, a vent cap assembly for recombining water for a battery is disclosed. The vent cap assembly includes a cylindrical base having an upper portion and a lower portion. The lower portion is configured to be inserted into a vent port of the battery. A cap encloses the base. A catalyst component is received in the base and is configured to hydronate hydrogen and oxygen to water. An insert is received in the upper portion of the base.

In yet another embodiment, a vent cap assembly for recombining water for a battery is disclosed. The vent cap assembly includes a cylindrical base having an upper portion and a lower portion. The lower portion is configured to be inserted into a vent port of the battery. The base has a pair of bayonet tabs formed on a lower portion thereof. A cap encloses the base. The cap receives a flame arrestor and a cap insert covering the flame arrestor. A catalyst component is received in the base configured to hydronate hydrogen and oxygen to water. An insert is received in the upper portion of the base, the insert receives the catalyst component.

BRIEF DESCRIPTION OF THE DRAWINGS

The above objects and advantages of the invention, as well as others, will become readily apparent to those skilled in the art from reading the following detailed description of a preferred embodiment of the invention when considered in the light of the accompanying drawings, in which.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention in any manner.

FIGS. 1-4 show a vent cap assembly 10 for a battery 12 according to an embodiment of the present invention. The vent cap assembly 10 is received in a cover 14 of the battery 12. It is understood that the cover 14 can be any suitable cover 14 as desired to form a substantially fluid-tight seal with the battery 12. The cover 14 includes at least one vent port 16 formed therein. In the embodiment illustrated in FIG. 1, a plurality of vent ports 16 are formed in the cover 14 in a linear configuration. However, the vent ports 16 can be formed in any pattern or configuration as desired, such as non-linear for example or in a vertical, horizontal, or diagonal configuration. As shown, each of the vent ports 16 includes a rim 18 circumscribing openings of the vent ports 16. The vents ports 16 further include a pair of diametrically opposed, radially inwardly extending bayonet tabs 23. It is understood, the cover 14 may also include other features and components necessary for operation of the battery 12 such as a pair of terminals (not shown) and a pair of mounting structures (not shown), for example. The cover 14 is formed from a thermochromic plastic resin. The thermochromic resin changes color as heat from a catalyst component 24 (described in further detail below) is generated. The change in color acts as an indicator that the vent cap assembly 10 is operating as desired. If a change of color does not occur, than a user is indicated the vent cap assembly 10 needs to be replaced or the battery 12 is not functioning properly.

As illustrated, the vent cap assembly 10 includes a cylindrical hollow base 20, a cap 22, and the cylindrical catalyst component 24. The base 20 can be formed from any suitable material as desired such as a plastic material, for example. As shown, the base 20 includes an upper portion 26 with an opening formed at a first end 20a of the base 20 and a lower portion 28 closed at an opposing second end 20b of the base 20. A rim 34 circumscribes the opening formed at the first end of the base 20. The closed second end of the base 20 includes a plurality of apertures 32 formed therein.

Figure 2:
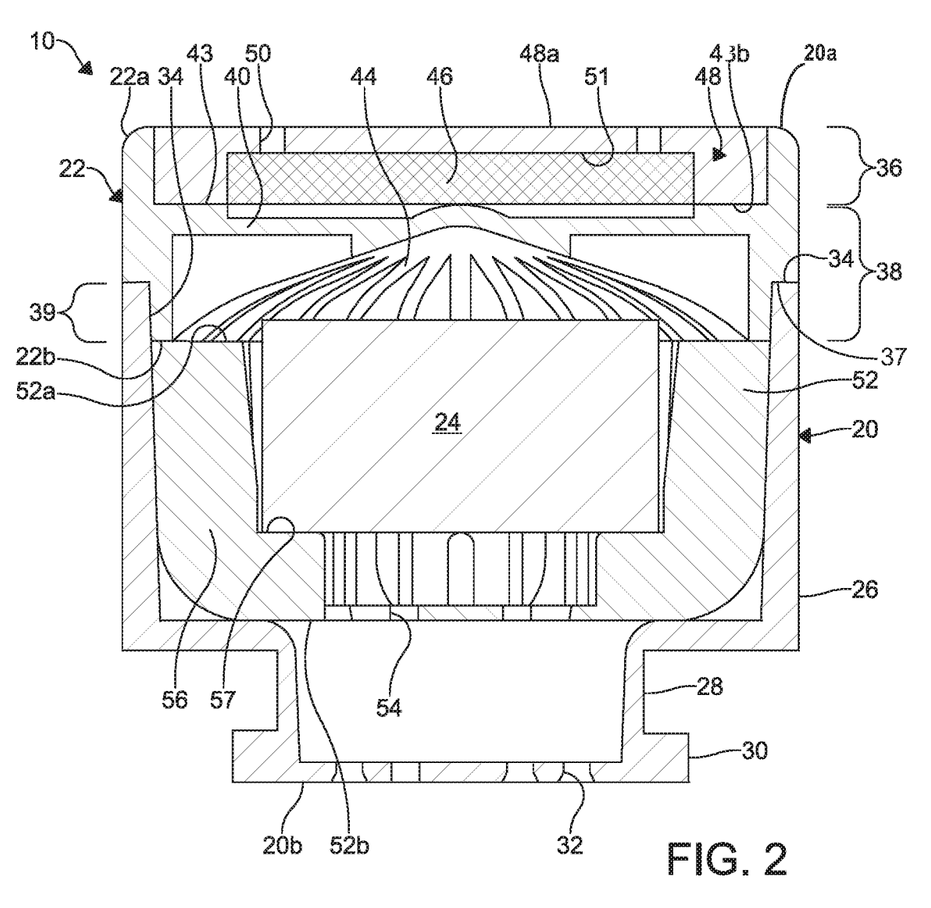
FIG. 2 is a cross-sectional view of the vent cap assembly of FIG. 1, taken along a vertical plane running lengthwise through the center of the vent cap assembly and through bayonet tabs of the vent cap assembly.
Figure 3:
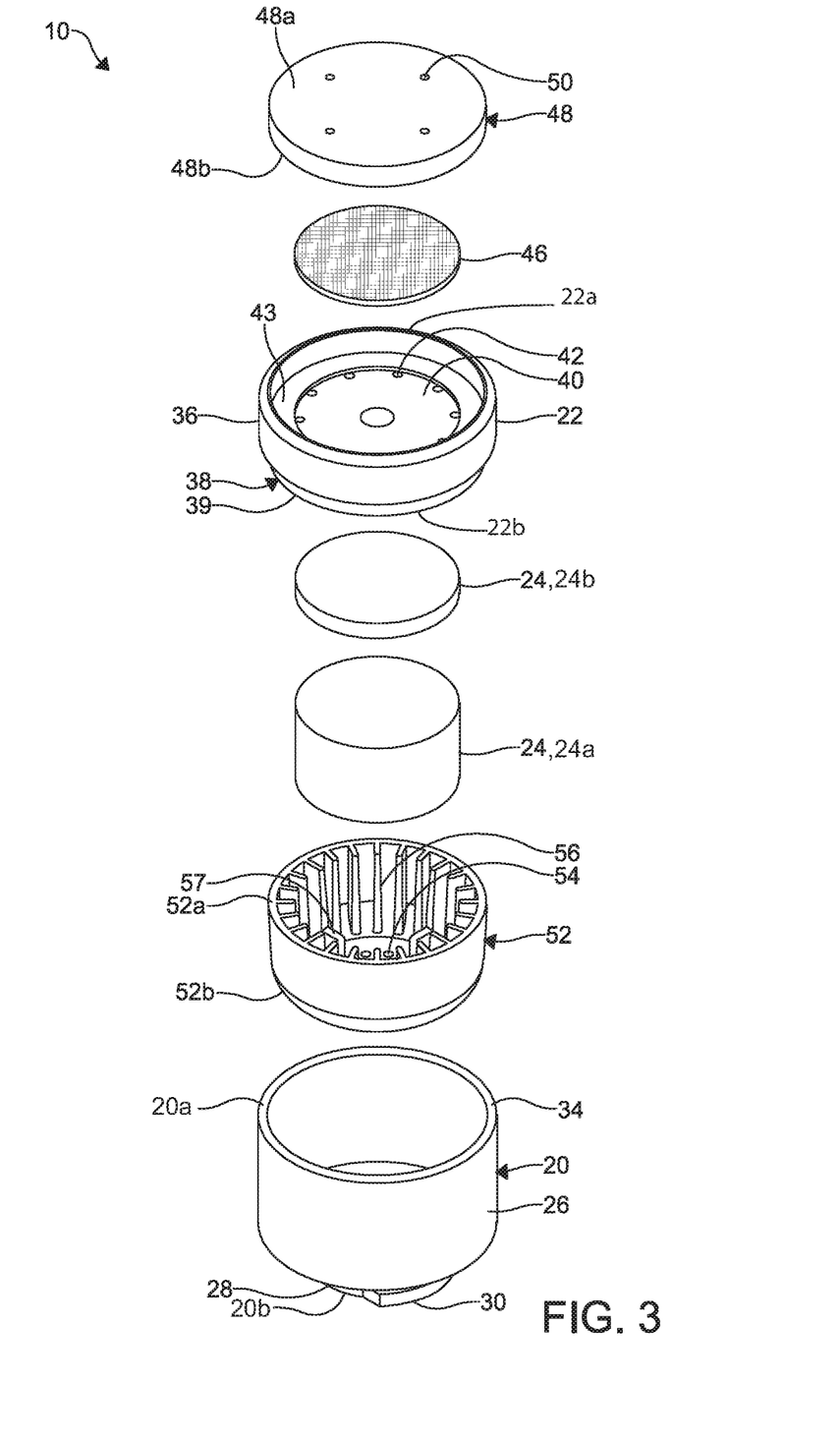
FIG. 3 is an exploded perspective view of the vent cap assembly of FIG. 1.

In a non-limiting example, the lower portion 28 of the base 20 has an outer diameter slightly less than a diameter between bayonet tabs 23 of the vent port 16 and less than an outer diameter of the upper portion 26 of the base 20. A pair of diametrically opposed, radially outwardly extending bayonet tabs 30 is formed on the lower portion 28 of the base 20. Each of the bayonet tabs 30 extends radially outwardly from the lower portion 28 of the base 20. A radial outer surface of each of the bayonet tabs 30 may be concentrically formed with an outer surface of the lower portion 28, and has a radius slightly less than an inner radius of the rim 18 of the vent port 16. As illustrated, each of the bayonet tabs 30 may circumscribe about 90 degrees around the lower portion 28 of the base 20. Although, it should be understood, each of the bayonet tabs 30 may circumscribe greater than or less than 90 degrees around the lower portion 28 of the base 20. Additionally, more than two or fewer than two bayonet tabs 30 can be formed on the lower portion 28 without departing from the scope of the present disclose.

Figure 4:
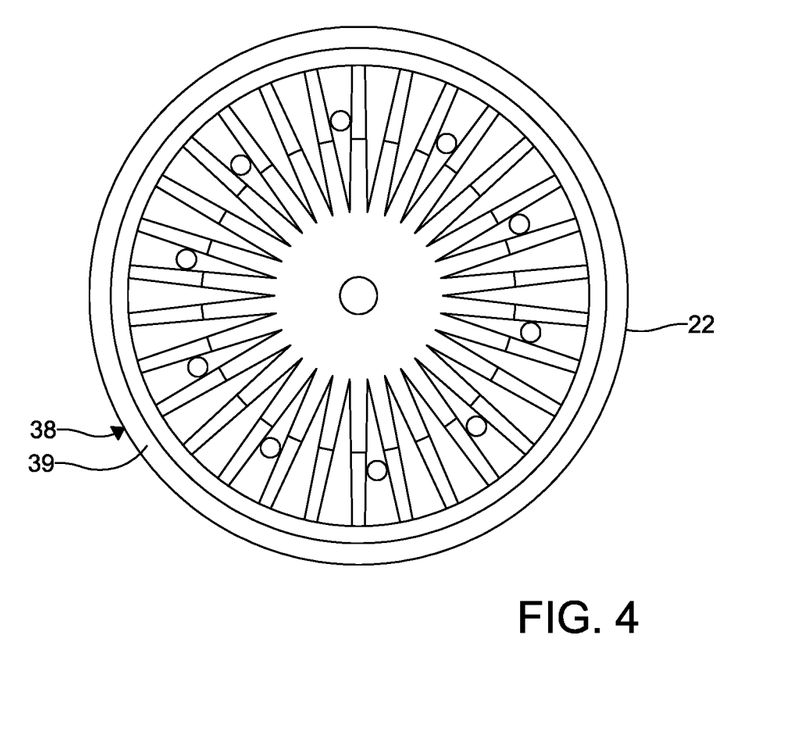
FIG. 4 is a bottom plan view of a cap of the vent cap assembly of FIGS. 1-3.
Figure 5:
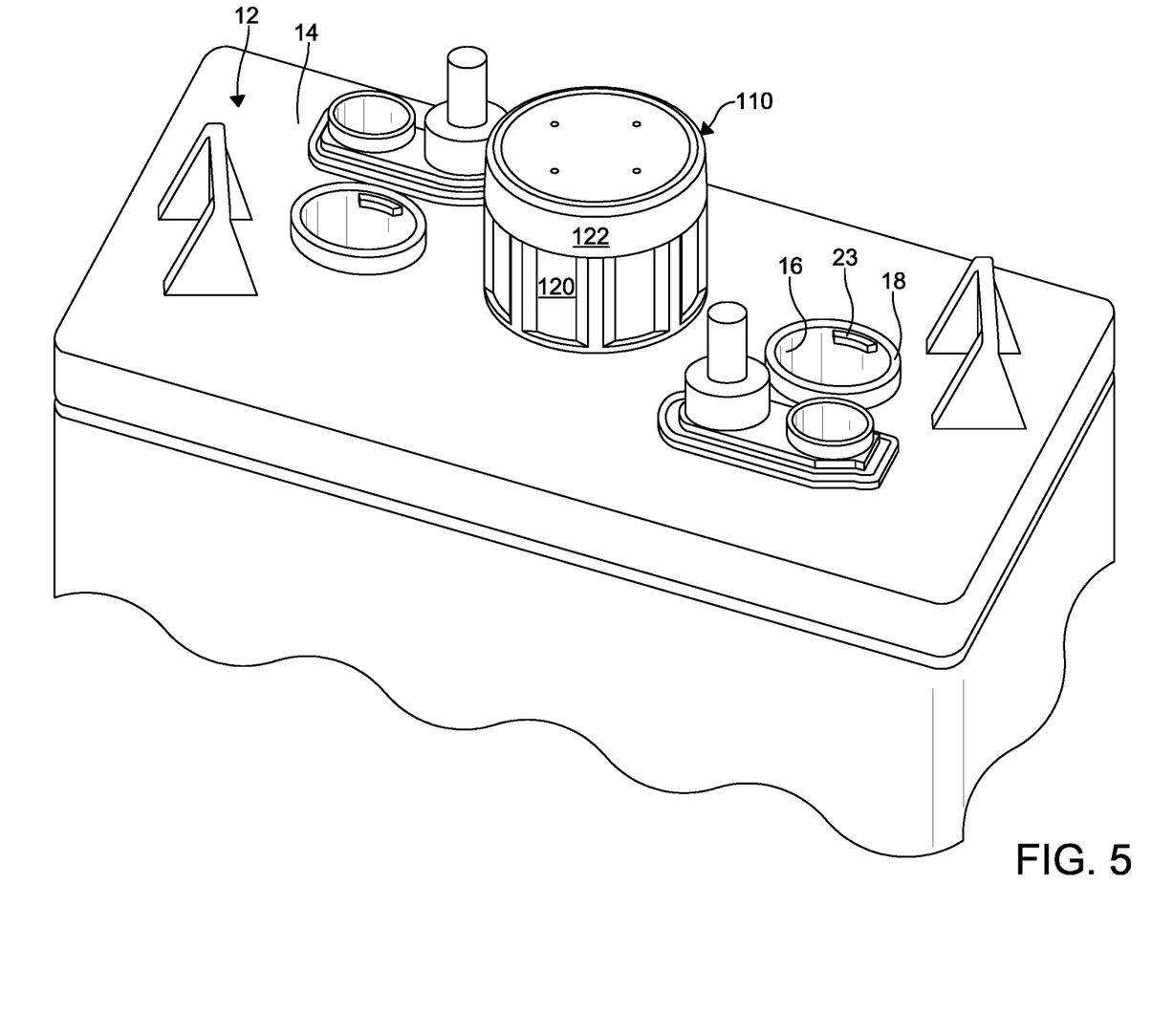
FIG. 5 is a fragmentary perspective view of a vent cap assembly received on a cover of a battery according to an alternate embodiment of the disclosure.
Figure 6:
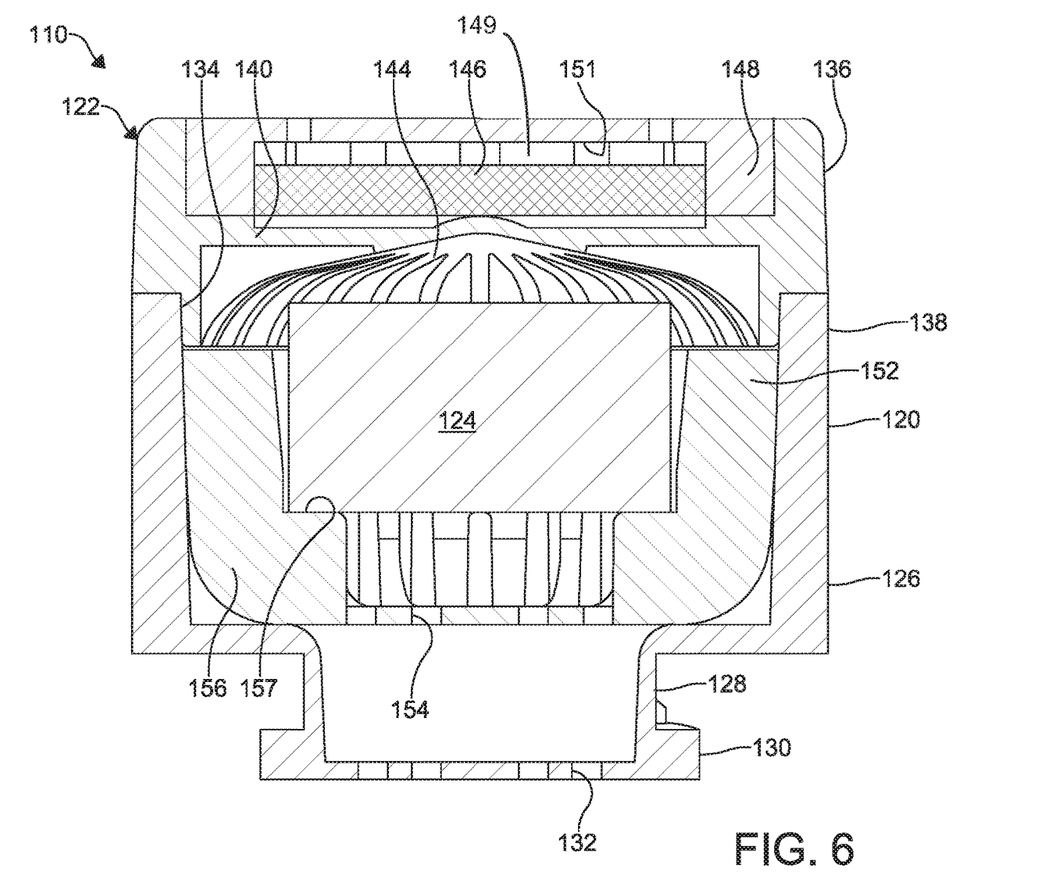
FIG. 6 is a cross-sectional view of the vent cap assembly of FIG. 4, taken along a vertical plane running lengthwise through the center of the vent cap assembly and through bayonet tabs of the vent cap assembly.
Figure 7:
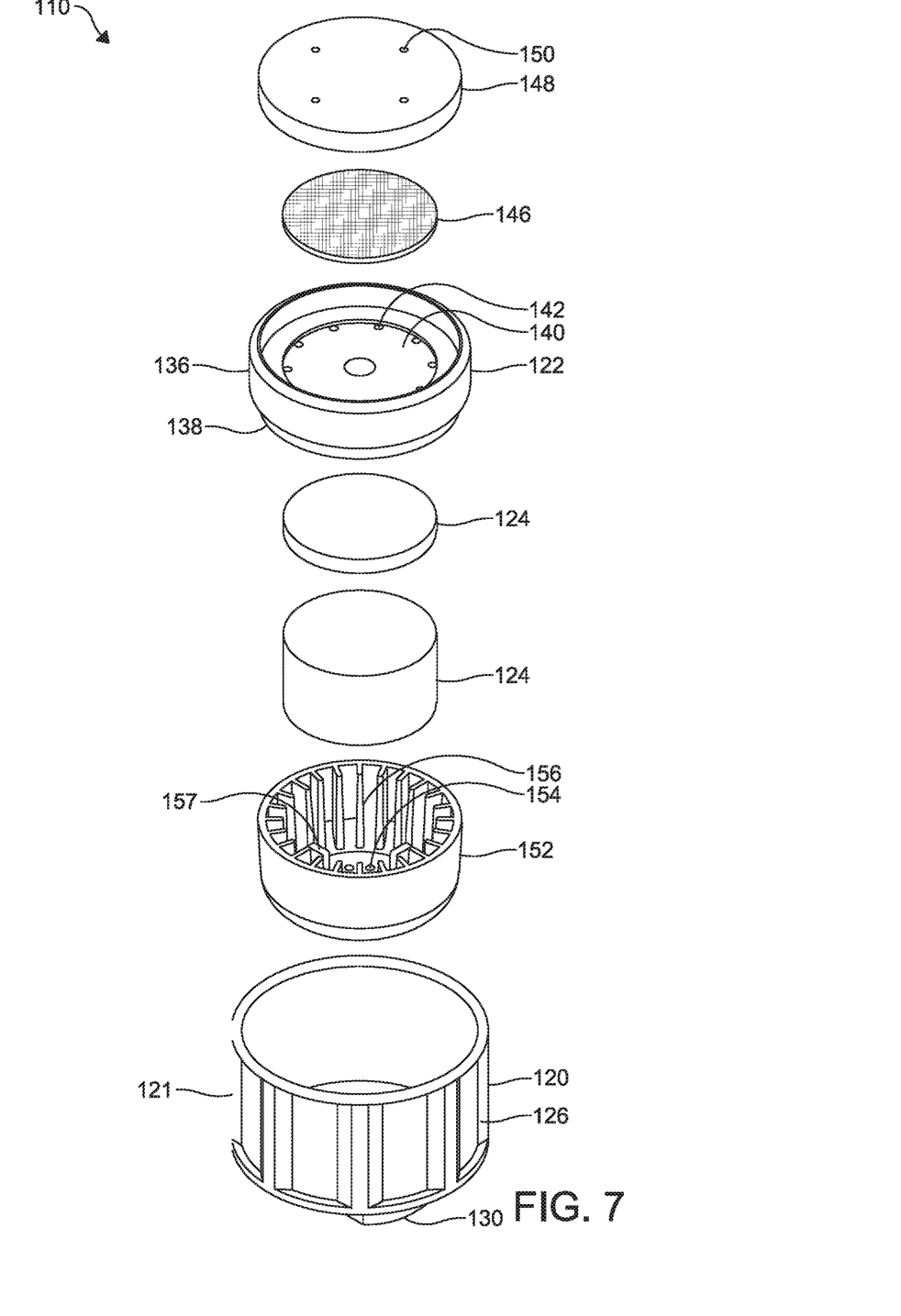
FIG. 7 is an exploded perspective view of the vent assembly of FIGS. 4-6.
Figure 8:
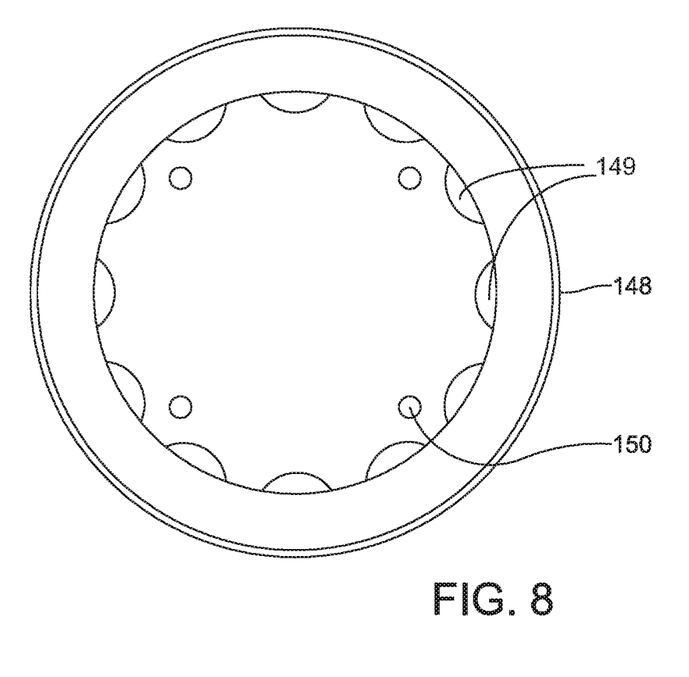
FIG. 8 is a bottom plan view of a cap insert of the vent cap assembly of FIGS. 4-7.

The cap 22 includes an upper portion 36 and a lower portion 38. An end portion 39 of the lower portion 38 has an outer diameter that is less than an outer diameter of the upper portion 36 and less than an inner diameter of the upper portion 26 of the base 20. The end portion 39 of the lower portion 38 is configured to be received in the first end 20a of the upper portion 26 of the base 20, wherein the rim 34 of the base 20 engages a stop 37 formed due to the smaller diameter of the end portion 39. The upper portion 36 of the cap 22 and a portion of the lower portion 38 of the cap 22 intermediate the end portion 39 and the upper portion 36 of the cap has an outer diameter substantially equal to an outer diameter equal to the outer diameter of the upper portion 26 of the base 20. The upper portion 36 is recessed at a first end 22a of the cap 22 and the lower portion 38 is recessed at an opposing second end 22b of the cap 22. A wall 40 is formed intermediate the first end 22a and the second end 22b of the cap 22 and divides the upper portion 36 from the lower portion 38. The wall 40 includes an annular array of apertures 42 formed therein. The apertures 42 provide fluid communication between the upper portion 36 and the lower portion 38 of the cap 22. An annular shoulder 43 extends outwardly from the wall 40 towards the first end 22a of the cap 22 and from an inner surface of the upper portion 38, but terminates before extending over the apertures 42.

An annular array of partitions 44 extends radially inwardly from an inner surface of the lower portion 38 of the cap 22 from the second end 22b of the cap 22 towards the wall 40. A lower edge of the partitions 44 is concave with respect to the second end 22b of the cap 22 to form, collectively, a substantially paraboloid shape. Each of the apertures 42 is disposed intermediate adjacent ones of the partitions 44. In the embodiment illustrated, the cap 22 includes ten apertures 42 substantially equally spaced from each other. However, more or fewer apertures 42 can be used or unequally spaced from each other, if desired.

In certain embodiments, the cap 22 receives a flame arrestor 46 in the recessed portion of the upper portion 36 of the cap 22. The flame arrestor 46 is formed from a substantially porous material such as a ceramic or a polyethylene/polypropylene material, for example. The flame arrestor 46 is configured to militate flames or sparks from flowing through a path therethrough and thus, from or to the vent ports 16. The flame arrestor 46 is substantially disc-shaped to correspond to an inner cross-section shape of the recess 51 of the cap insert 48. However, it is understood, the flame arrestor 46 can be formed in other shapes and configurations or can be formed from other materials that militate against the flow of flames and/or sparks from traveling through the vent cap assembly 10.

A disc shaped cap insert 48 may also be received in the recessed portion of the upper portion 36 to surround and cover the flame arrestor 46. The cap insert 48 includes a plurality of apertures 50 formed therein. A first end 48a of the cap insert 48 is substantially planar and a second end 48b of the cap insert 48 includes a recess 51 formed therein for receiving the flame arrestor 46. The apertures 50 formed in the cap insert 48 provide fluid communication between the environment surrounding the vent cap assembly 10 and the recess 51 receiving the flame arrestor 46. In the embodiment illustrated, the cap insert 48 includes four of the apertures 50. However, the cap insert 48 can include any number of the apertures 50, as desired.

An insert 52 is received in the upper portion 26 of the base 20. The insert 52 is hollow and cylindrical. A first end 52a of the insert 52 is open and a second end 52b of the insert 52 is closed. A plurality of apertures 54 is formed in the closed second end of the insert 52 and configured to provide fluid communication between the base 20 and a cell of the battery 12. The apertures 54 are formed in a pair of concentrically formed arrays. However, the apertures 54 can be formed in any irregular or regular configurations as desired. An annular array of elongate protuberances 56 extends radially inwardly from an inner surface of a wall of the insert 52. At least a portion of the protuberances 56 have a tab 57 extending radially inwardly therefrom. In the embodiment illustrated, there are four tabs 57 extending inwardly from the protuberances 56. However, there can be more than or fewer than four tabs 57 if desired. The tabs 57 are configured for engaging and supporting the catalyst component 24.

The catalyst component 24 is received in the hollow portion of the insert 52 beneath the cap 22. The protuberances 56 circumscribe the catalyst component 24. The catalyst component 24 is a substantially cylindrically shaped container formed from a hollow body 24a with a lid 24b. The body 24a and the lid 24b are formed from a porous ceramic container such as KELLUNDITE® ceramic containers. The lid 24b is coupled to the body 24a by an adhesive, for example a high temperature ceramic adhesive such as RESPOND™ 907GF adhesive and sealant. However, it is understood, other materials can be employed to form the container or couple the lid 24b to the body 24b. The body is filled with a powder such as a powdered aluminum oxide and spheres (not shown). In the embodiment shown, the spheres have a diameter in the range of about 0.10 inches to 0.150 inches. The spheres may be formed from an aluminum oxide and coated with a combination of noble metals. The spheres assist in converting hydrogen and oxygen emitted from the battery 12 into water in a process called hydrogenation. The catalyst component 24 is supported by the tabs 57 extending from the protuberances 56. The cap 22 encloses and cooperates with the insert 52 and base 20 to stabilize the catalyst component 24 within the vent cap assembly 10.

In certain embodiments (not shown), the vent cap assembly 10 can include plastic pellets disposed therein, such as in the base 20 or insert 52. The plastic pellets facilitate an aggregation process, wherein the plastic pellets increase a surface area within the vent cap assembly 10 to condense and capture vapor coming from the battery 12. Additionally, the vent cap assembly 10 may include a bi-directional valve (now shown). The bi-directional valve is formed from a rubber material, however, other materials can be contemplated. The bi-directional valve maintains a constant pressure within the vent cap assembly 10. The bi-directional valve releases any gases if the pressure within the vent cap assembly 10 increases undesirably. It is understood, while not shown, the vent cap assembly 10 can be included in a gang vent assembly, if desired, wherein the removal of more than one vent cap assembly 10 can be accomplished mechanically by one device. Furthermore, the catalyst component 24 can incorporate a pore blocking compound to seal areas or include a hydrophobic compound to facilitate repelling water from the catalyst component 24. In yet another embodiment, the catalyst component 24 can be formed from two components, wherein the first component is a cup having inwardly extending beveled edges containing the materials of the catalyst component and the second component is a lid. The lid has a diameter greater than a diameter of the cup to direct water away from the catalyst component 24.

To assemble the vent cap assembly 10, the cap insert 48 is received in the base 20. The catalyst component 24 is received in the cap insert 48 and engages the tabs 57 extending from the protuberances 56. When received in the cap insert 48, a portion of the catalyst component 24 extends outwardly from the first end of the base 20. The lower portion 38 of the cap 22 is received in the upper portion 26 of the base 20 and engages the lip 34 formed in the base 20. The cap 22 cooperates with the base 20 and the insert 52 to stabilize and minimize a movement of the catalyst component 24 within the vent cap assembly 10. The flame arrestor 46 is then positioned in the recessed portion of the upper portion 36 of the cap 22. The cap insert 48 is thereafter positioned in the recessed portion of the upper portion 36 of the cap 22 to cover the flame arrestor 46 and is maintained within the recessed portion by an interference fit with the cap 22. The insert 48 can be formed from a material similar to or separate from the materials of the remaining components of the vent cap assembly 10 depending on the heat capacity required.

Figure 1:
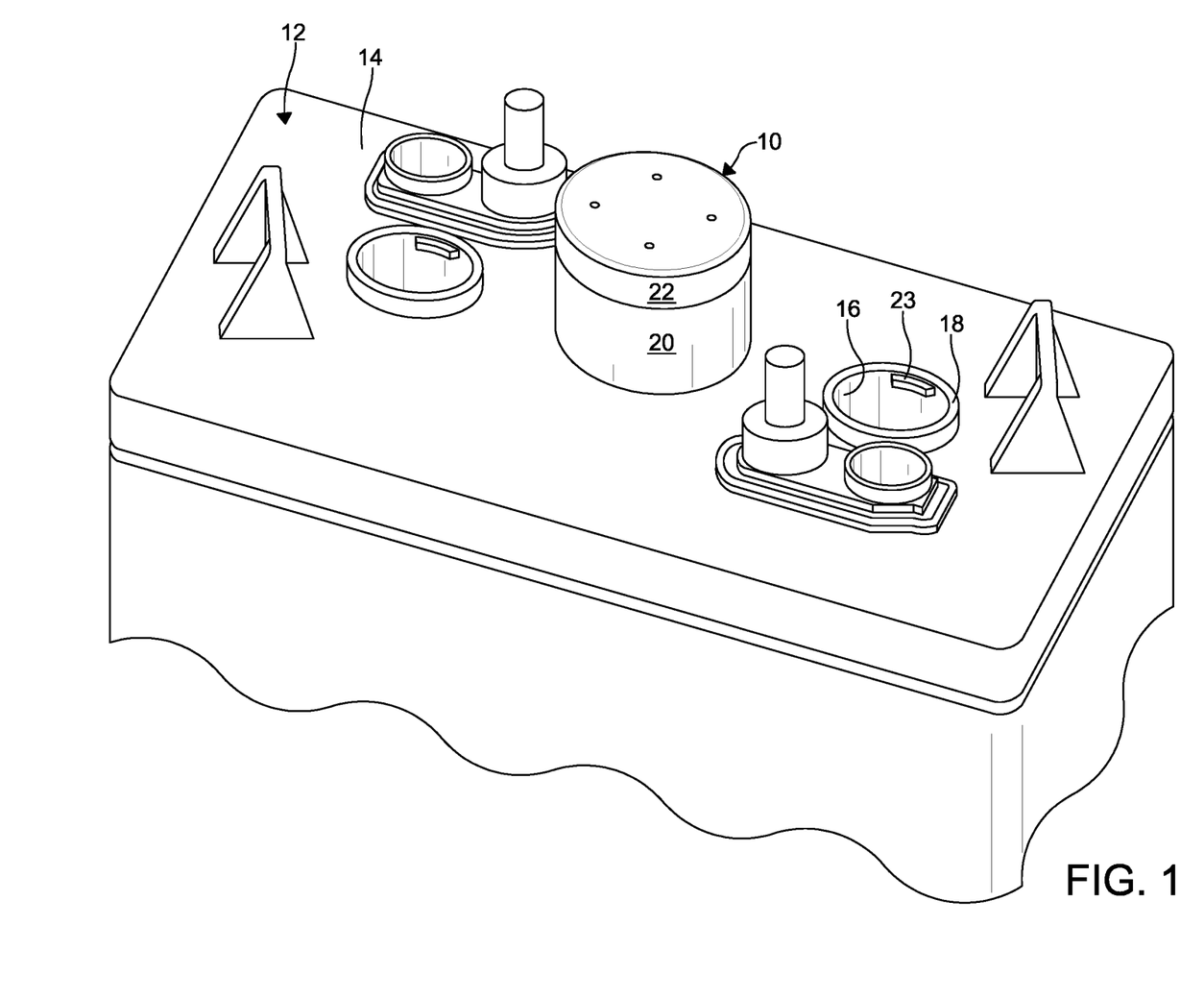
FIG. 1 is a fragmentary perspective view of a vent cap assembly received on a cover of a battery according to an embodiment of the disclosure.

During installation of the vent cap assembly 10 in the cover 14, the vent cap assembly 10 is aligned with the vent port 16 of the cover 14. More particularly, the bayonet tabs 30 of the vent cap assembly 10 are aligned with spaces intermediate the respective bayonet tabs 23 of the vent port 16. The lower portion 28 of the base 20 of the vent cap assembly 10 is inserted into the vent port 16, and the vent cap assembly 10 is rotated, wherein the bayonet tabs 30 of the vent cap assembly 10 engage the bayonet tabs 23 of the vent port 16.

In operation, as the electrolyte evaporates, the vent cap assembly 10 collects the hydrogen and oxygen emitted from the battery 12 during an electrolysis process that decomposes water into hydrogen and oxygen. The vent gases enter the lower cavity portion 28 of the base 20 through the apertures 32 and are directed into the upper portion 26 of the base 20. The vent gases are then vented through the apertures 54 in the insert 52. The vent gases enter the catalyst component 24 within the chamber where the process of hydrogenation occurs. The water formed from the hydrogenation process is then drained back into the battery 12 via the apertures 54 of the insert 52 and the apertures 32 of the base 20, thereby minimizing the requirement to replenish the water in the battery 12. Any other vent gases are released from the vent cap assembly 10 through the flame arrestor 46.

Advantageously, the vent cap assembly 10 according to the present disclosure increases the amount of water captured and recombined to the battery 12 compared to prior art battery vent caps. The vent cap assembly 10 can capture, rehydronate, and recombine about 90-95% of the water in the battery 12, thereby prolonging the time intervals between maintenance of the battery 12.

FIGS. 5-8 illustrate a vent cap assembly 110 according to another embodiment of the instant disclosure. Features of the vent cap assembly 110 of FIGS. 5-8 similar to the vent cap assembly 10 of FIGS. 1-4 include the same reference numerals but with a preceding "1" for reference. The vent cap assembly 110 of FIGS. 5-8 is similar to the vent cap assembly 10 of FIGS. 1-4 except the base 120 has grip protuberances 121 form vertically on an outer surface thereof to facilitate gripping and rotating the vent cap assembly 110. The cap insert 148 includes an array of bulbous formations 149 formed on the recess 151 thereof.

FIGS. 9-14 illustrate a vent cap assembly 210 according to another embodiment of the instant disclosure. Features of the vent cap assembly 210 of FIGS. 9-14 are similar to the vent cap assemblies 10, 110 of FIGS. 1-8 and include the same reference numerals but with a preceding "2" for reference. The vent cap assembly 210 of FIGS. 9-14 includes a hollow base 220, a cap 222, and a cylindrical catalyst component 224. The base 220 can be formed from any suitable material as desired such as a plastic material, for example. As shown, the base 220 includes an upper portion 226 with an opening formed at a first end 220a of the base 220 and a lower portion 228 closed at a second end 220b of the base 220. A rim 234 circumscribes the opening formed at the first end 220a of the base 220. The closed second end 220b of the base 220 includes a plurality of lattice shaped-apertures 232 formed therein.

Figure 10:
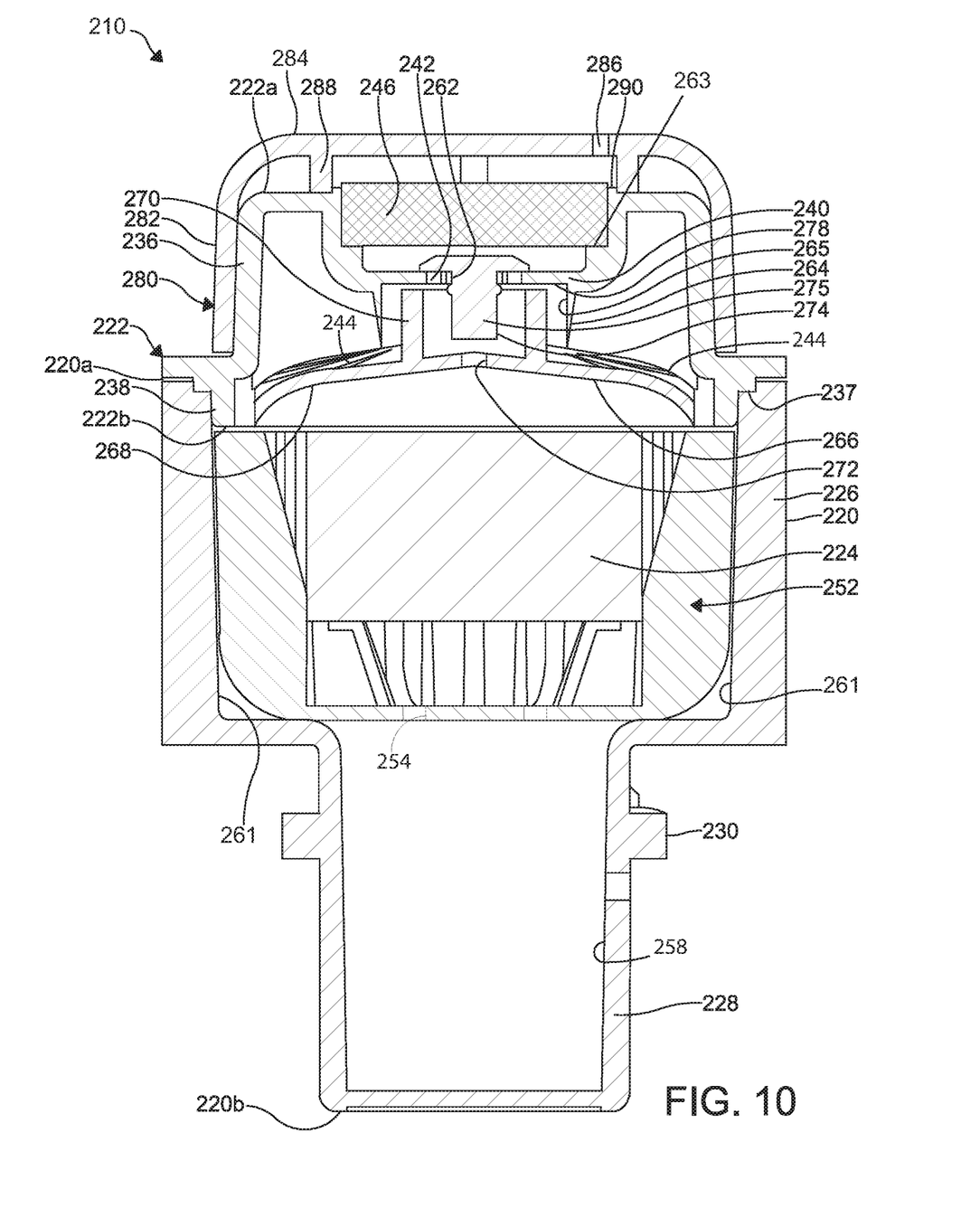
FIG. 10 is a cross-sectional view of the vent cap assembly of FIG. 9, taken along a vertical plane running lengthwise through the center of the vent cap assembly and through bayonet tabs of the vent cap assembly.
Figure 11:
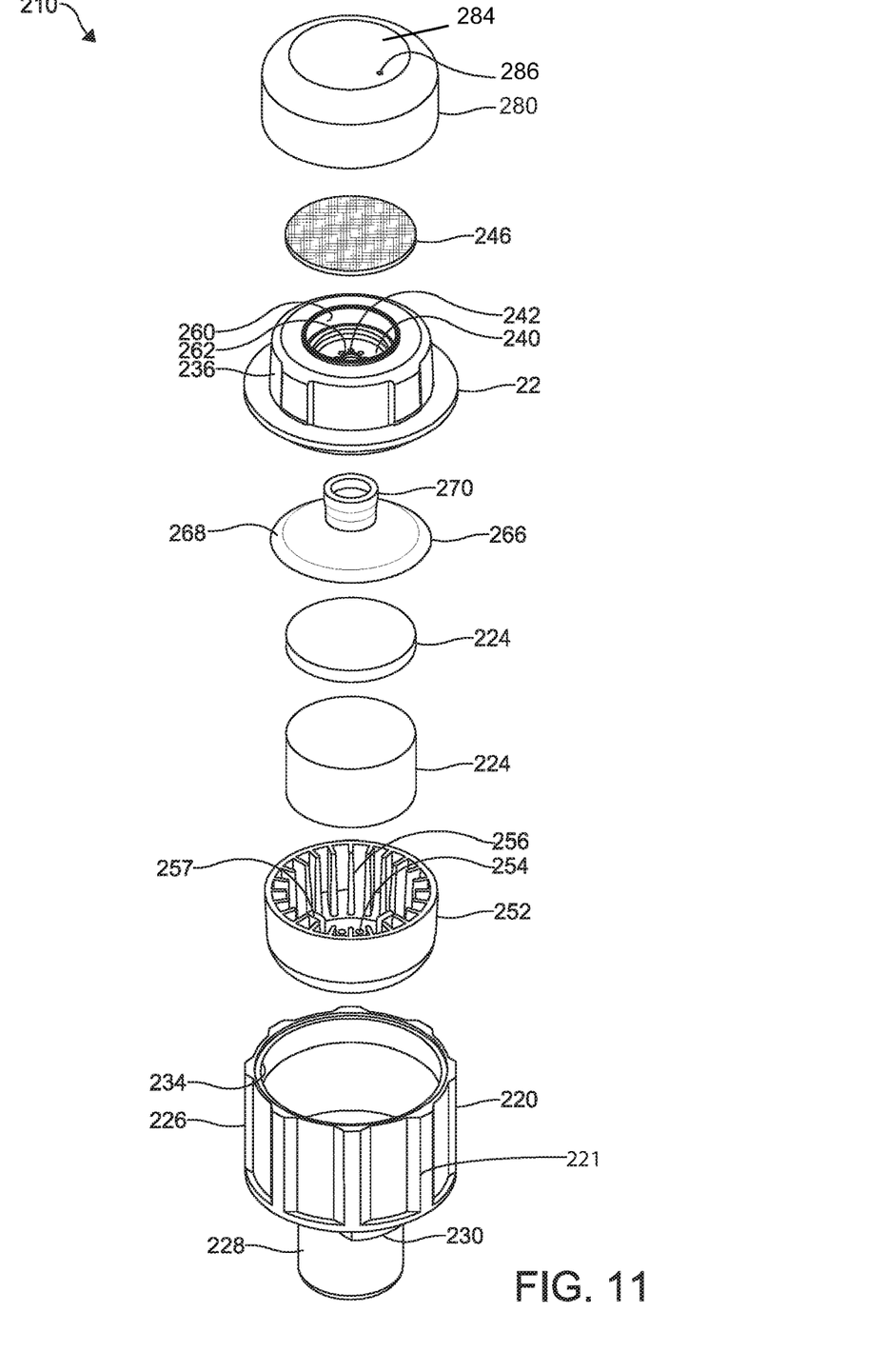
FIG. 11 is an exploded perspective view of the vent cap assembly of FIG. 10.

In a non-limiting example, the lower portion 228 of the base 220 has a diameter slightly smaller than a diameter between the bayonet tabs 223 of the vent port 216 and smaller than the upper portion 226 of the base 220. A pair of diametrically opposed, radially outwardly extending bayonet tabs 230 is formed on a portion of the lower portion 228. The bayonet tabs 230 are spaced from the second end 220b of the base 220 and the upper portion 226 of the base 220. Each of the bayonet tabs 230 extends radially outwardly from the lower portion 228 of the base 220. A radial outer surface of each of the bayonet tabs 230 may be concentrically formed with an outer surface of the lower portion 228, and has a radius slightly smaller than an inner radius of the rim 218 of the vent port 216. As illustrated, each of the bayonet tabs 230 may circumscribe about 90 degrees around the lower portion 228 of the base 220. The lower portion 228 of the base 220 defines a chamber 258 configured to receive pellets. The upper portion 226 of the base 220 defines a chamber 261 for receiving the catalyst component 224.

Figure 12:
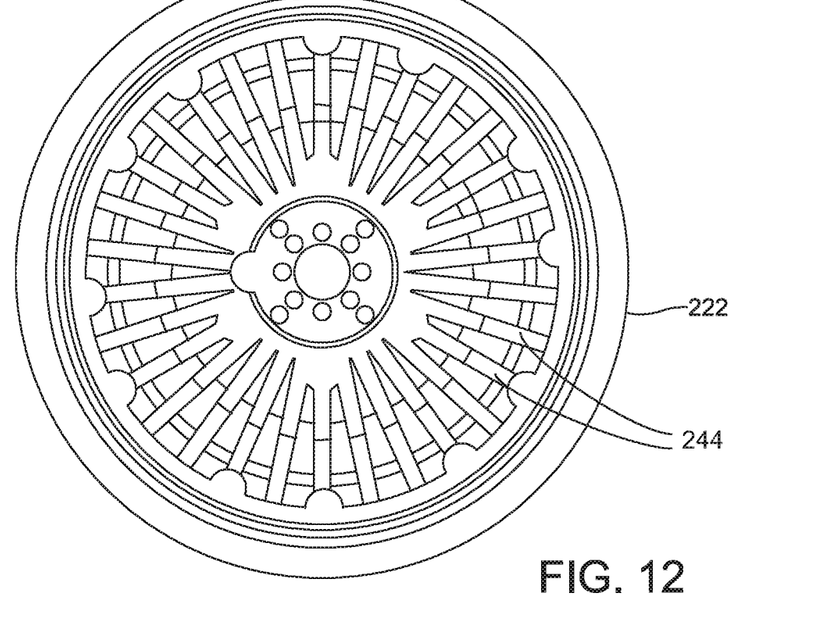
FIG. 12 is a bottom plan view of a cap of the vent cap assembly of FIGS. 10-11.

The cap 222 includes an upper portion 236 and a lower portion 238. The lower portion 238 has a diameter that is smaller than a diameter of the upper portion 236 of the base 220 and is configured to be received in the upper portion 226 of the base 220. An annular shoulder 237 is formed on the lower portion 238 to engage the rim 234 of the base 220. The upper portion 236 is recessed at a first end 222a of the cap 222 and the lower portion 238 is recessed at a second end 222b of the cap 222. A wall 240 defining a portion of the recessed portion is formed intermediate the first end 222a and the second end 222b of the cap 222. The wall 240 includes an annular array of apertures 242 formed therein and a hole 262 formed at a center of the annular array of apertures 242. An annular wall 264 extends outwardly from a lower surface of the wall 240 in a direction opposite the upper portion 236 to form a chamber 265. An annular array of partitions 244 extends radially inwardly from an inner surface of the lower portion 238 of the cap 222 towards an end of the annular wall 264. A lower edge of the partitions 244 is concave with respect to the second end 222b of the cap 222 to form, collectively, a substantially paraboloid shape. Partitions (not shown) may also extend along an inner surface of the annular wall 264.

In certain embodiments, the cap 222 receives a flame arrestor 246 in the recessed portion of the upper portion 236 of the cap 222. The flame arrestor 246 is supported by a shoulder 263 formed on the inner sidewall surface of the recessed portion. The flame arrestor 246 is formed from a substantially porous material such as a ceramic or a polyethylene/polypropylene material, for example. The flame arrestor 246 is configured to militate flames or sparks from flowing through a path therethrough and thus, from or to the vent ports 216. The flame arrestor 246 is substantially disc-shaped. However, it is understood, the flame arrestor 46 can be formed in other shapes and configurations or can be formed from other materials that militate against the flow of flames and/or sparks from traveling through the vent cap assembly 210.

An umbrella 266 is received in the lower portion 238 of the cap 222. The umbrella 266 has a substantially parabolic lower portion 268 and a substantially annular upper portion 270. The parabolic shape of the lower portion 268 corresponds to the shape of the lower edge of the partitions 244. The umbrella 266 is received in the lower portion 238 of the cap 222. The upper portion 270 is annular and formed around an aperture 272 formed in the lower portion 268 and is configured to receive a stem 275 of a valve 274 configured as a bi-directional valve. The upper portion 270 is received in the chamber 265 and the lower portion 268 is received within a parabolic chamber formed by the partitions 244. In certain embodiments, a plate 278 is formed intermediate the wall 240 and the upper portion 270 of the umbrella 266.

A hollow cover 280 is formed from an annular wall 282 and a top wall 284. The hollow cover 280 is configured to enclose the recessed portion of the cap 222. The cover 280 has a vent hole 286 formed therein configured to release gases from the vent cap assembly 210. The upper portion 236 of the cap 222 is received in the cover 280. A pair of semi-annular walls 288 extends outwardly from an inner surface of the top wall 284 to receive a rim 290 of the cap 222 encircling the recessed portion.

Figure 13:
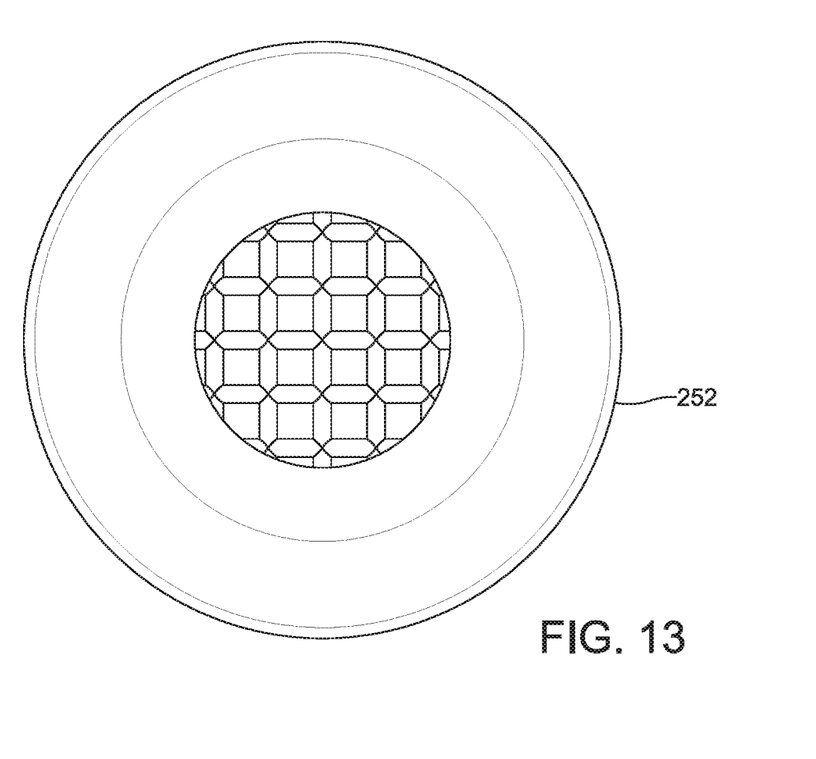
FIG. 13 is a bottom plan view an insert of the vent cap assembly of FIGS. 10-11.
Figure 14:
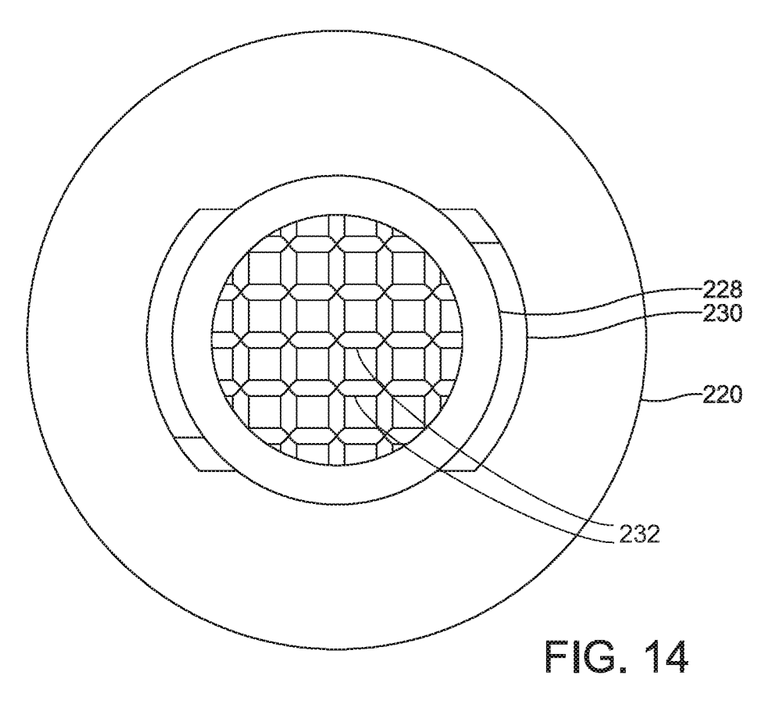
FIG. 14 is a bottom plan view of a base of the vent cap assembly of FIGS. 10-11.

An insert 252 as shown is substantially similar to the insert 252 described hereinabove with reference to FIGS. 1-6. The insert 252 is received in the upper portion 226 of the base 220 as described hereinabove. The insert 252 of the vent cap assembly 210 of FIGS. 1-6 has lattice shaped apertures 250 formed at the closed end of the insert 252 to provide fluid communication between the lower portion 228 of the base 220 and the insert 252.

The catalyst component 224 is substantially similar to the catalyst component 224 described hereinabove with reference to FIGS. 1-6. The catalyst component 224 is received in the hollow portion of the insert 252 beneath the cap 222 and the umbrella 266.

To assemble the vent cap assembly 210, the insert 252 is received in the base 220. The catalyst component 224 is received in the insert 252. The lower portion 238 of the cap 222 is received in the upper portion 226 of the base 220 and engages the shoulder 234 formed in the base 220. The umbrella 266 covers the catalyst component 224. The cap 222 is positioned in engagement with the base 220 and the umbrella 266, wherein the lower portion 228 of the cap 222 is received in the upper portion 236 of the base 220 and the upper portion 270 of the umbrella 266 is received in the annular wall 264 of the cap 222. The cap 222 cooperates with the base 220 and the insert 252 to stabilize and minimize a movement of the catalyst component 224 within the vent cap assembly 210.

The stem 275 of the valve 274 is received through the hole 262 of the cap 222 and the upper portion 270 of the umbrella 266. The flame arrestor 246 is then positioned in the recessed portion of the upper portion 236 of the cap 222. The cover 280 is thereafter positioned to cover the recessed portion of the upper portion 236 of the cap 222.

Figure 9:
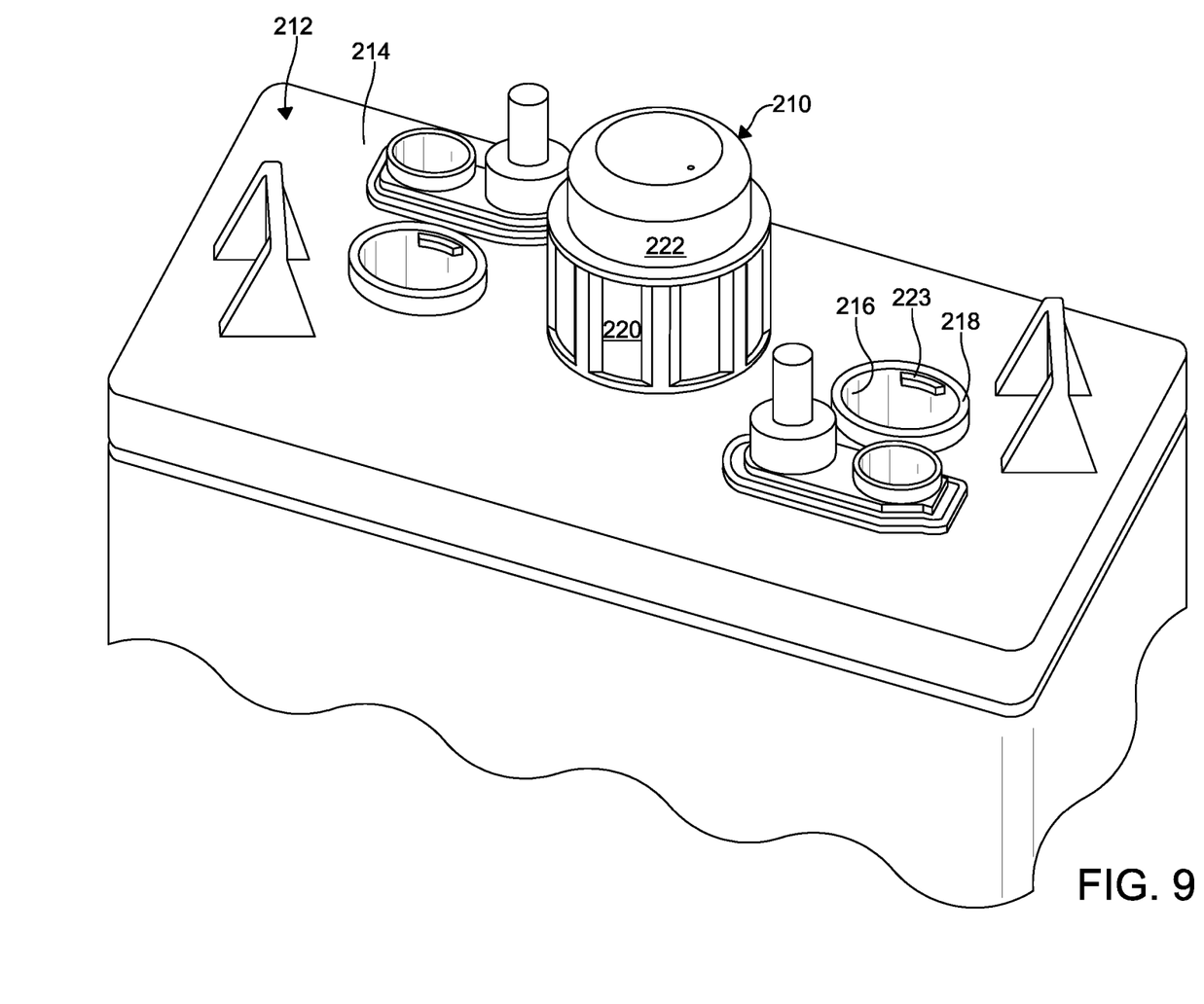
FIG. 9 is a fragmentary perspective view of a vent cap assembly received on a cover of a battery according to an alternate embodiment of the disclosure.

During installation of the vent cap assembly 210 in the cover 214, the vent cap assembly 210 is aligned with the vent port 216 of the cover 214. More particularly, the bayonet tabs 230 of the vent cap assembly 210 are aligned with spaces intermediate the respective bayonet tabs 223 of the vent port 216. The lower portion 228 of the base 220 of the vent cap assembly 210 is inserted into the vent port 216, and the vent cap assembly 210 is rotated, wherein the bayonet tabs 230 of the vent cap assembly 210 engage the bayonet tabs 223 of the vent port 216.

Advantageously, the vent cap assemblies 10, 110, 210 minimize the evaporation of water from the battery cell, thereby prolonging longevity of the battery 12 and increases the length of intervals between maintenance of the battery 12. The vent cap assemblies 10, 110, 210 are robust and are easy to assemble, couple to the cover, and maintain.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A vent cap assembly for recombining water for a battery, the vent cap assembly comprising:
    a cylindrical base having an upper portion and a lower portion integrally formed with the upper portion of the base, the lower portion of the base configured to be inserted into a vent port of the battery, and wherein the upper portion of the base has a diameter larger than a diameter of the lower portion of the base;
    a cap enclosing the cylindrical base; and
    a catalyst component received in the base configured to hydronate hydrogen and oxygen to water.

2. The vent cap assembly of claim 1, wherein the cylindrical base includes a pair of bayonet tabs formed on an outer surface of the lower portion of the base.

3. The vent cap assembly of claim 1, wherein the base includes a plurality of apertures formed therein.

4. The vent cap assembly of claim 3, wherein the plurality of apertures of the base is formed in a lattice configuration.

5. The vent cap assembly of claim 1, wherein the cap includes an upper portion and a lower portion, wherein a portion of the lower portion of the cap has a diameter smaller than a diameter of the upper portion of the cap, and wherein the lower portion of the cap is received in and engages the upper portion of the base.

6. The vent cap assembly of claim 5, wherein a wall divides the upper portion of the cap from the lower portion of the cap, and wherein the wall extends along a plane extending perpendicular to an axial direction of the base.

7. The vent cap assembly of claim 5, wherein an annular array of partitions extends radially inwardly from an inner surface of the lower portion of the cap.

8. The vent cap assembly of claim 7, wherein a lower edge of the partitions collectively form a substantially paraboloid shape.

9. The vent cap assembly of claim 8, wherein a plurality of apertures is formed in the wall of the cap, and wherein each of the plurality of apertures is disposed intermediate adjacent ones of the partitions.

10. The vent cap assembly of claim 5, wherein a cap insert having a plurality of apertures is received in the upper portion of the cap.

11. The vent cap assembly of claim 10, wherein a flame arrestor is positioned in the upper portion of the cap intermediate the cap and the cap insert.

12. The vent cap assembly of claim 1, wherein the base has a plurality of grip protuberances formed vertically on an outer surface of the upper portion thereof.

13. The vent cap assembly of claim 1, further comprising a bi-directional valve disposed in an aperture formed in the cap.

14. The vent cap assembly of claim 1, further comprising an umbrella disposed intermediate the cap and the base, the umbrella having a substantially parabolic lower portion and a substantially annular upper portion.

15. A vent cap assembly for recombining water for a battery, the vent cap assembly comprising:
    a cylindrical base having a first open end, a second closed end, an upper portion, and a lower portion, the lower portion configured to be inserted into a vent port of the battery, wherein the upper portion of the base has a diameter greater than a diameter of the lower portion;
    a cap enclosing the base;
    a catalyst component received in the base configured to hydronate hydrogen and oxygen to water; and
    an insert received in the upper portion of the base, the insert receiving the catalyst component, wherein the insert is received through the first open end of the base and is disposed intermediate the lower portion of the base and the cap.

16. The vent cap assembly of claim 15, wherein the insert includes an open end and a closed end, wherein the closed end of the insert is received in the upper portion of the base, and wherein the closed end of the insert has a plurality of apertures formed therein.

17. The vent cap assembly of claim 16, wherein an annular array of elongate protuberances extends radially inwardly from an inner surface of the insert.

18. The vent cap assembly of claim 15, wherein the cap includes a recessed upper portion and a recessed lower portion integrally formed with the recessed upper portion, and wherein a portion of the recessed lower portion has a diameter smaller than a diameter of the upper portion.

19. The vent cap assembly of claim 18, wherein a cap insert is received in the upper portion of the cap and a flame arrestor is received in the upper portion of the cap intermediate the cap insert and the cap.

20. A vent cap assembly for recombining water for a battery, the vent cap assembly comprising:
    a cylindrical base having a first open end, a second closed end, an upper portion, and a lower portion, the lower portion configured to be inserted into a vent port of the battery, the base having a pair of bayonet tabs formed on a lower portion thereof, wherein the upper portion of the base has a diameter greater than a diameter of the lower portion;
    a cap enclosing the base, the cap receiving a flame arrestor and a cap insert covering the flame arrestor;
    a catalyst component received in the base configured to hydronate hydrogen and oxygen to water; and
    an insert received in the upper portion of the base, the insert receiving the catalyst component, wherein the insert is received through the first open end of the base and is disposed intermediate the lower portion of the base and the cap.

* * * * *